(12) United States Patent
Carolan

(10) Patent No.: US 7,157,873 B2
(45) Date of Patent: Jan. 2, 2007

(54) SYSTEMS AND METHODS FOR REDUCING TORQUE DISTURBANCE IN DEVICES HAVING AN ENDLESS BELT

(75) Inventor: Kevin Michael Carolan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 12 days.

(21) Appl. No.: 11/118,488

(22) Filed: May 2, 2005

(65) Prior Publication Data

US 2006/0244404 A1  Nov. 2, 2006

(51) Int. Cl.
*H02P 7/00* (2006.01)
(52) U.S. Cl. .......................... 318/432; 318/34; 318/69; 318/434; 318/646; 198/571; 198/572; 198/575; 198/577; 198/608; 198/619; 198/634; 198/761; 198/762; 198/788
(58) Field of Classification Search ...................... None
See application file for complete search history.

(56) References Cited

U.S. PATENT DOCUMENTS

| | | | |
|---|---|---|---|
| 5,208,523 A * | 5/1993 | Harman ....................... 318/685 |
| 5,282,005 A | 1/1994 | Nowak et al. |
| 5,329,341 A | 7/1994 | Nowak et al. |
| 5,357,324 A * | 10/1994 | Montfort ...................... 399/319 |
| 5,359,154 A * | 10/1994 | Tsukasa et al. .............. 177/145 |
| 5,512,989 A * | 4/1996 | Montfort ...................... 399/296 |
| 5,512,990 A | 4/1996 | Friel et al. |
| 5,512,991 A | 4/1996 | Montfort |
| 5,515,148 A | 5/1996 | Montfort |
| 6,042,917 A * | 3/2000 | Schlueter et al. .............. 428/60 |
| 6,157,804 A * | 12/2000 | Richmond et al. .......... 399/319 |
| 6,259,219 B1 * | 7/2001 | Strauch et al. .............. 318/285 |
| 6,507,725 B1 | 1/2003 | Adams et al. |
| 6,725,101 B1 | 4/2004 | Sanchez et al. |
| 2005/0033500 A1 * | 2/2005 | Moss ......................... 701/100 |

* cited by examiner

*Primary Examiner*—Lincoln Donovan
*Assistant Examiner*—Erick Glass
(74) *Attorney, Agent, or Firm*—Min, Hsieh & Hack, LLP

(57) ABSTRACT

A system for reducing torque disturbance includes a motor mechanically coupled to an endless belt. The motor is operable to drive the belt, and the belt has a seam that causes a torque disturbance to the system. The system includes a data structure having a set of values that indicates an amount of compensation for reducing the torque disturbance and a controller electrically coupled with the motor. The controller is configured to control the motor and reduce the torque disturbance based on the set of values in the data structure.

19 Claims, 5 Drawing Sheets

SYSTEMS AND METHODS FOR REDUCING TORQUE DISTURBANCE IN DEVICES HAVING AN ENDLESS BELT

TECHNICAL FIELD

This invention relates to printing systems and methods and, more particularly, to systems and methods for canceling torque disturbance in devices using an endless belt.

BACKGROUND

Any discussion of the related art throughout the specification should in no way be considered as an admission that such related art is widely known or forms part of common general knowledge in the field.

Conventional printing machines often include a photoreceptor belt driven in a cyclical manner by a motor. The motor is typically controlled by a closed-loop feedback controller, such as a proportional-integral-differential controller. The closed-loop controller strives to achieve a desired belt velocity by incorporating feedback from operation of the machine. As shown by the jagged line in FIG. 4, the actual belt velocity closely approximates, but nonetheless varies from, the desired belt velocity.

In conventional machines having an endless belt, that is, a belt having two ends joined together to form a seam, the seam may cause undesirable errors, for example, a torque disturbance outside the bandwidth of the closed-loop system. For example, the operational frequency of the controller may not be adequate to timely detect and resolve the errors resulting from the seam. Instead the controller is late to correct the actual torque disturbance 420 (FIG. 4) and causes a lagged disturbance 424.

Some printing systems, for example, color printing systems benefit from higher degrees of accuracy due to the overlaying of different colored images over one another. Accordingly, it may be desirable to provide systems and method for reducing torque disturbance in devices having an endless belt, for example, printing systems.

SUMMARY

According to various aspects of the invention, a system for reducing torque disturbance may include a motor mechanically coupled to an endless belt. The motor may be operable to drive the belt, and the belt may have a seam that causes a torque disturbance to the system. The system may include a data structure having a set of values that indicates an amount of compensation for reducing the torque disturbance and a controller electrically coupled with the motor. The controller may be configured to control the motor and reduce the torque disturbance based on the set of values in the data structure.

In accordance with various aspects of the invention, a method for reducing torque disturbance may include controllably operating a motor to drive an endless belt in a cyclical manner, determining when a seam of the belt is expected cause a torque disturbance in a system, determining an amount of compensation for reducing the torque disturbance, and controllably operating the motor based on the amount of compensation to reduce the torque disturbance.

According to various aspects of the invention, a printing system may include a belt having two ends joined together to form a seam, a motor mechanically coupled to the belt, and an acoustic transfer assist device configured to transfer an image from the belt to a medium. The motor may be operable to drive the belt, and the assist device may include a vacuum source for drawing the belt toward the assist device. The vacuum source and the seam may cooperate to cause a torque disturbance to the system. The system may include a data structure having a set of values that indicates an amount of compensation for reducing the torque disturbance caused by the seam and a controller electrically coupled with the motor. The controller may be configured to control the motor and reduce the torque disturbance based on the set of values in the data structure.

BRIEF DESCRIPTION OF THE DRAWINGS

The accompanying drawings, which are incorporated in and form part of the specification, illustrate various aspects of the present invention and, together with the description, describe those various aspects. Throughout the drawings, like numbers are used to represent like parts.

DETAILED DESCRIPTION

The following detailed description is provided to facilitate an understanding of some of the innovative features unique to the present invention. A full appreciation of the various aspects of the invention can only be gained by taking the entire specification, claims, drawings, and abstract as a whole.

Figure 1:
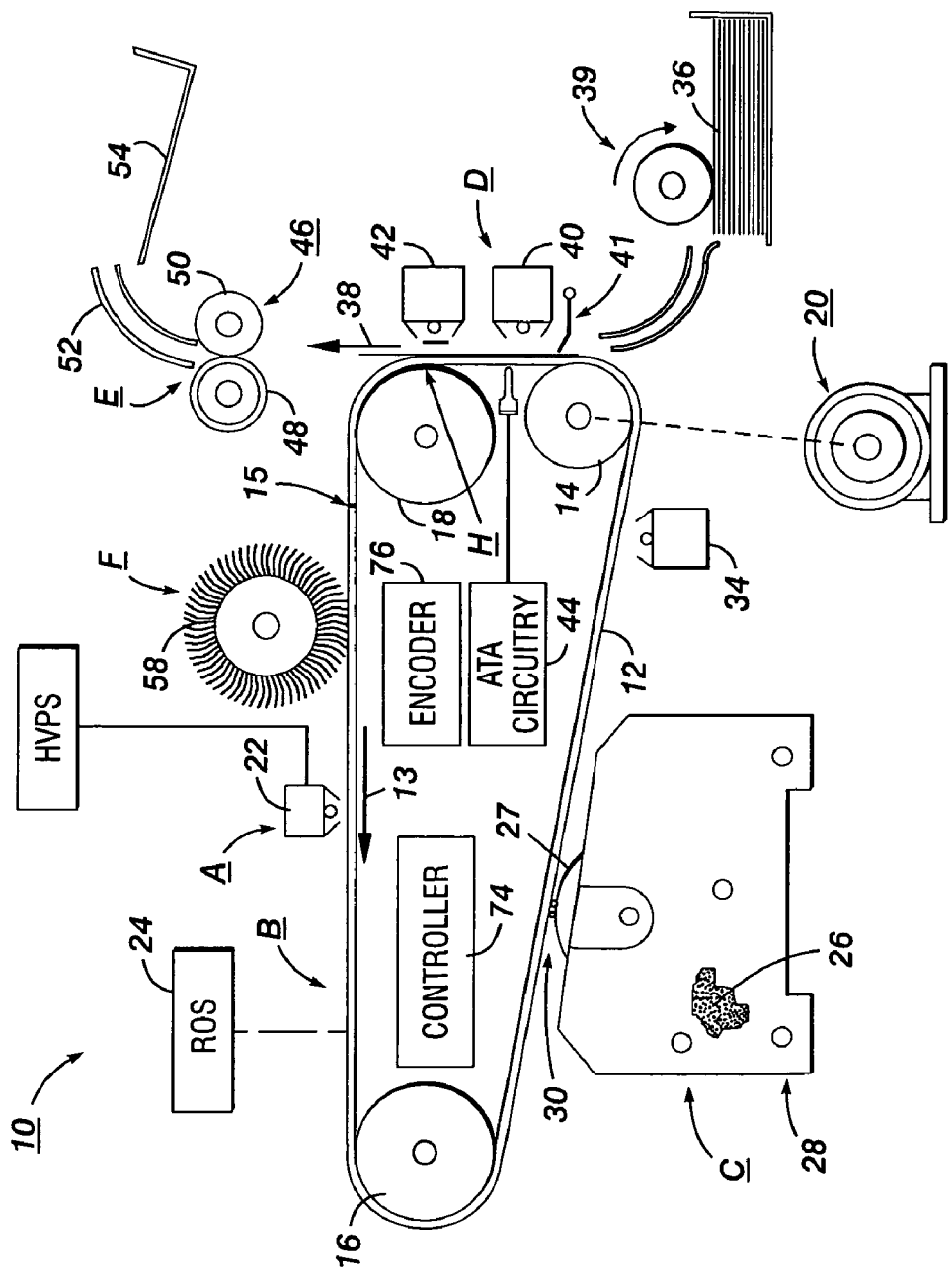
FIG. 1 is a schematic diagram of an exemplary printing machine in accordance with various aspects of the invention.

Referring to the drawings and in particular to FIG. 1, an image forming device, for example, an electrophotographic printing machine 10, is shown. The printing machine 10 creates an image in a single pass through the machine. It should be appreciated that the present invention may be used in an electrophotographic printing machine which utilizes an image on image process to create a color image on a sheet in a single pass through the machine, or which creates a single black toner image on a sheet.

The printing machine 10 uses a charge retentive member or imaging member in the form of a photoreceptor belt 12, which travels sequentially through various process stations in the direction indicated by the arrow 13. Belt travel may be achieved by mounting the belt 12 about a drive roller 14 and two tension rollers 16 and 18 and then rotating the drive roller 14 via a drive motor 20.

As the photoreceptor belt 12 moves, each part of it passes through each of the subsequently described process stations. For convenience, a single section of the photoreceptor belt, referred to as the image area, is identified. The image area is the part of the photoreceptor belt which is to receive a toner powder image which, after being transferred to a substrate such as a sheet of paper, produces the final image. It should be appreciated that the photoreceptor belt may have a plurality of image areas, depending on the length of the belt and the size of the images.

As the photoreceptor belt 12 moves, the image area passes through a charging station A. A corona generating device 22 charges the image area to a relatively high and substantially uniform potential at the charging station A. The corona generating device 22 is powered by a high voltage power supply (HVPS).

After passing through the charging station A, the now charged image area passes through an exposure station B. At exposure station B, the charged image area is exposed to light, which illuminates the image area with a light representation of an image. The light representation discharges some parts of the image area so as to create an electrostatic latent image. While the illustrated embodiment uses a laser based output scanning device 24 or raster output scanner (ROS) as a light source, it is to be understood that other light sources, for example an LED printbar, can also be used with the principles of the present invention. It should also be appreciated that the present invention may be practiced in a light lens machine in which an image is formed by passing light through an original document to expose the photoconductive surface.

After passing through the exposure station B, the now exposed image area passes through a development station C. The development station C deposits an image of negatively charged toner 26 onto the image area. The toner is attracted to the less negative sections of the image area and repelled by the more negative sections. The result is a toner powder image on the image area.

The development station C incorporates a donor roll 27 in a development system 28. An electrode grid 30 is electrically biased with an AC voltage relative to the donor roll 27 for the purpose of detaching toner therefrom so as to form a toner powder cloud in the gap between the donor roll 27 and the photoreceptor belt 12. Both the electrode grid 30 and the donor roll 27 are biased at a DC potential for discharge area development (DAD). The discharged photoreceptor image attracts toner particles from the toner powder cloud to form a toner powder image thereon.

Thereafter, the toner powder image is advanced past a corotron member 34 to a transfer station D. At the transfer station D, the toner powder image is transferred from the image area onto a support sheet 36 (e.g. a sheet of paper, a transparency, or any other member adapted to receive marking particles thereon). It should be understood that the sheet 36 is advanced onto the photoreceptor belt 12 by a conventional sheet feeding apparatus schematically shown by reference numeral 39. The sheet then advances through the transfer station D in the direction of arrow 38. The transfer station D includes a transfer assist blade system 41 which is operable to apply uniform contact pressure to the sheet 36 as the sheet is advanced onto the photoreceptor belt 12 by the sheet feeding apparatus 39. In particular, as the sheet is being advanced onto the photoreceptor belt 12, a transfer assist blade (not shown) of the transfer assist blade system 41 presses the sheet 36 into contact with the toner powder image on the photoreceptor belt 12 thereby substantially eliminating any spaces between the sheet 36 and the toner powder image. One exemplary transfer assist blade system which may be used with the present invention is disclosed in U.S. Pat. No. 5,300,993 issued to Vetromile, the disclosure of which is totally incorporated herein by reference in its entirety.

The transfer station D further includes a transfer corona device 40 which sprays positive ions onto the sheet 36. Also, at transfer station D, an acoustic transfer assist (ATA) system 44 is operable to impart vibrations to the photoreceptor belt 12 during operation of the corona device 40. Operation of these devices 40, 44 cause the negatively charged toner powder image to move onto the sheet 36. Positioned downstream relative to the transfer corona device 40 is a detack corona device 42 which facilitates removal of the sheet 36 from the photoreceptor belt 12.

After being advanced through the transfer station D, the sheet 36 moves onto a conveyor (not shown) which advances the sheet to a fusing station E. The fusing station E includes a fuser assembly 46 which is operable to permanently affix the transferred powder image to the sheet 36. Preferably, the fuser assembly 46 includes a heated fuser roller 48 and a backup or pressure roller 50. When the sheet 36 passes between the fuser roller 48 and the backup roller 50, the toner powder is permanently affixed to the sheet 36. After fusing, a chute 52 guides the sheet 36 to a catch tray 54 for removal by an operator.

After the sheet 36 has separated from the photoreceptor belt 12, the image area is advanced toward a cleaning station F. Upon arrival at the cleaning station F, residual toner particles on the image area are removed via a cleaning brush 58 located at the cleaning station F. The image area is then ready to begin a new marking cycle.

The various machine functions described above are generally managed and regulated by a controller 74 which provides electrical command signals for controlling the operations described above. The controller 74 may be any conventional controller, for example, a closed-loop feedback controller, such a proportional-integral-differential controller or the like. The controller 74 may control the operations based on various information, for example, velocity and position information relating to the photoreceptor belt 12. Such information about the photoreceptor belt 12 may be provided by an encoder 76, for example, an optical encoder, associated with, for example, one of the tension rollers 16, 18, the drive roller 14, or the motor 20.

Figure 2:
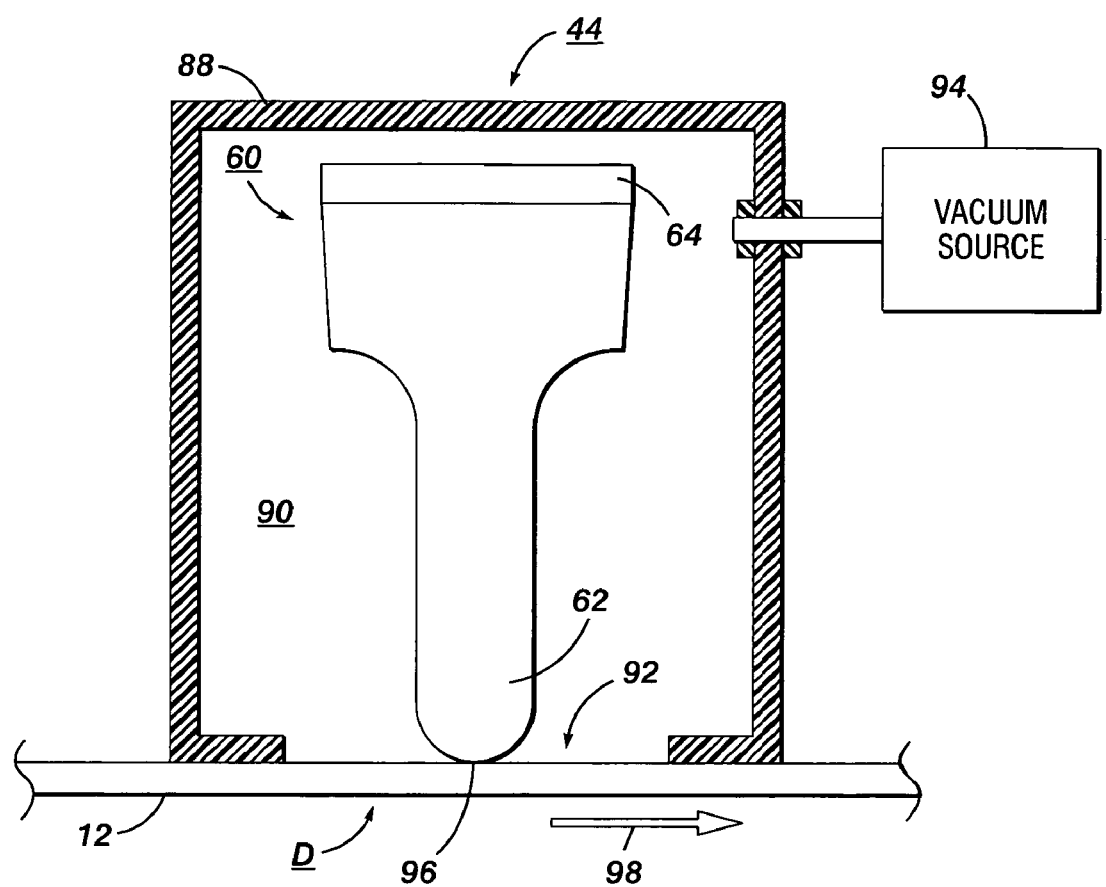
FIG. 2 is a schematic diagram of an exemplary acoustic transfer assist system for use with the exemplary machine of FIG. 1.

Turning now to FIG. 2, the ATA system 44 is shown in more detail. The ATA system 44 may be substantially similar to the ATA system disclosed in U.S. Pat. No. 6,157,804 issued to Richmond et al., the disclosure of which is totally incorporated herein by reference in its entirety. Since acoustic transfer assist systems in general are well known in the art, only some of the components of the ATA system 44 will be discussed herein in detail. Examples of some acoustic transfer assist systems are disclosed in the following U.S. Patents, the disclosure of each of such patents being totally incorporated herein by reference in its entirety: U.S. Pat. No. 5,515,148 issued May 7, 1996 entitled "Resonator Assembly Including a Waveguide Member Having Inactive End Segments"; U.S. Pat. No. 5,512,991 issued Apr. 30, 1996 entitled "Resonator Assembly Having an Angularly Segmented Waveguide Member"; U.S. Pat. No. 5,512,990 issued Apr. 30, 1996 entitled "Resonating Assembly Having a Plurality of Discrete Resonator Elements"; U.S. Pat. No. 5,512,989, issued Apr. 30, 1996 entitled "Resonator Coupling Cover for use in Electrostatographic Applications"; U.S. Pat. No. 5,357,324 issued Oct. 18, 1994 entitled "Apparatus for applying Vibratory Motion to a Flexible Planar Member"; U.S. Pat. No. 5,329,341 issued Jul. 12, 1994 entitled "Optimized Vibratory Systems in Electrophotographic Devices"; and U.S. Pat. No. 5,282,005 issued Jan. 25, 1994 entitled "Cross Process Vibrational Mode Suppression in High Frequency Vibratory Energy Producing Devices for Electrophotographic Imaging".

As shown in FIG. 2, the ATA system 44 includes a horn-shaped transducer 60 having waveguide segments 62 that engage the backside (i.e., non-image side) of the photoreceptor belt 12 at the transfer station D. The ATA assembly 44 may include a housing 88 defining a cavity 90 in which the transducer 60 is located. The transducer 60 further has a piezoelectric element 64 that is driven by a drive circuit (not shown). The housing 88 further defines an opening 92 in the housing that is juxtaposed to the photoreceptor belt 12 at the transfer station D. A vacuum source 94 may be positioned in fluid communication with the cavity 90. The vacuum source 94 may be operable to generate a vacuum of, for example, −50.0 mmHg within the cavity. When the vacuum source 94 is operated so as to generate a vacuum in the cavity 90, the photoreceptor belt 12 is drawn toward the opening 92 thereby forcing a lower tip 96 of the transducer 60 into continuous engagement with the photoreceptor belt 12 during advancement of the belt 12 in the direction of arrow 98.

Figure 3:
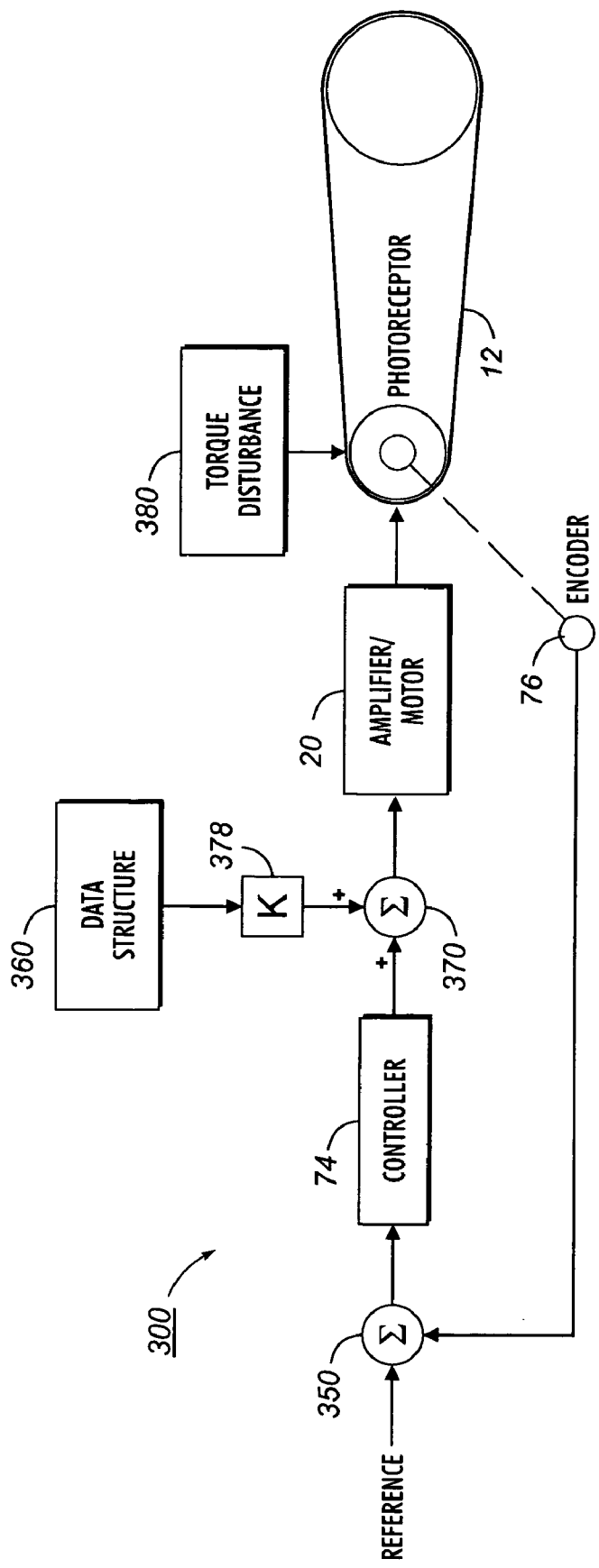
FIG. 3 is a block diagram of an exemplary system for reducing torque disturbance in accordance with various aspects of the invention.

Referring now to FIG. 3, a system 300 for reducing torque disturbance in the printing machine 10 is described. The system 300 may be embodied in the controller 74 or a separate controller associated with the printing machine 10. The system 300 may comprise signals to and from the controller 74, the motor 20, the photoreceptor belt 12, and the encoder 76.

A reference signal is combined with system feedback from the encoder 76 at summation point 350. Based on the output of summation point 350, the closed loop compensator 374 determines an appropriate signal for controlling the motor 20. During portions of the operation of the printing machine 10, the photoreceptor belt 12 does not cause significant torque disturbance 380 in the system 300. However, when the seam 15 of the photoreceptor belt 12 is near the acoustic assist device opening 92, a brief loss of the vacuum force on the belt may occur, causing an undesirable amount of torque disturbance 380 to the system 300.

When the controller 74 determines that the torque disturbance is expected to occur, the controller 74 can control the motor 20 with a compensation amount determined from a data structure 360. The data structure 360 may comprise a lookup table, a mathematical algorithm, or a combination thereof. The compensation amount may be retrieved from a lookup table or determined by a mathematical algorithm. The compensation amount from the data structure 360 may be adjusted via gain factor 378 and may be combined with the output of the closed loop compensator 374 at summation point 370. It should be appreciated that during operation of the printing machine 10 when the seam 15 is not at the opening 92 of the acoustic assist device 44, the system 300 operates as a conventional closed-loop feedback system.

Figure 4:
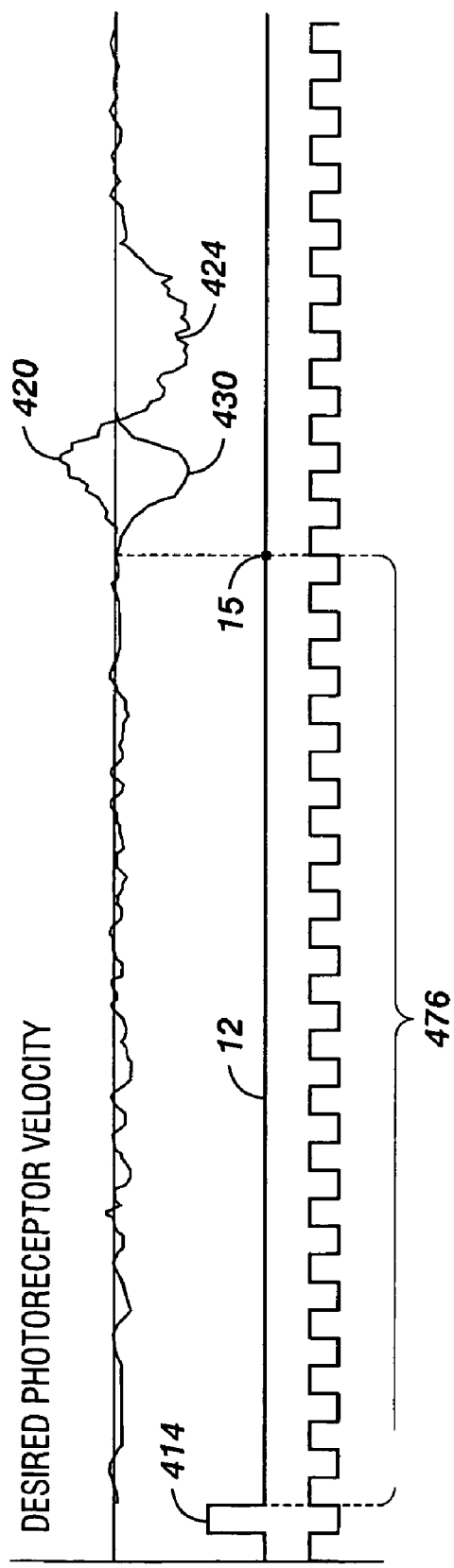
FIG. 4 is a combination schematic diagram and graph illustrating and exemplary torque disturbance and synchronization of a signal to reduce the torque disturbance.

FIG. 4 illustrates an exemplary manner in which the controller 74 may identify when the torque disturbance 420 is expected to occur. The photoreceptor belt 12 may include a position marker 414 such as, for example, a hole, a cutout, a notch, or any other sensable feature, and the distance between the position marker 414 and belt seam 15 can be easily determined. For any given speed of the motor 20, the belt seam 15 will be at the opening 92 of the acoustic transfer assist device 44 during substantially the same period of each cycle of the belt 12. Thus, the number of pulses 476 of the encoder 76 occurring in the time period between detection of the position marker 414 and seam being at the opening 92 of the assist device 44 can be used to determine the time at which the torque disturbance is expected to occur. It should be appreciated that the number of pulses 476 shown in FIG. 4 is only exemplary, and the actual number of pulses occurring in the time period between detection of the position marker 414 and seam being at the opening 92 of the assist device 44 may be more or less than the number illustrated.

As shown in FIG. 4, the compensation amounts determined from the data structure 378 define the compensation profile 430. The compensation profile 430 is selected to reduce and/or substantially cancel the torque disturbance 420, and to eliminate the lagging torque disturbance 424 caused by late correction of the torque disturbance 420.

Figure 5:
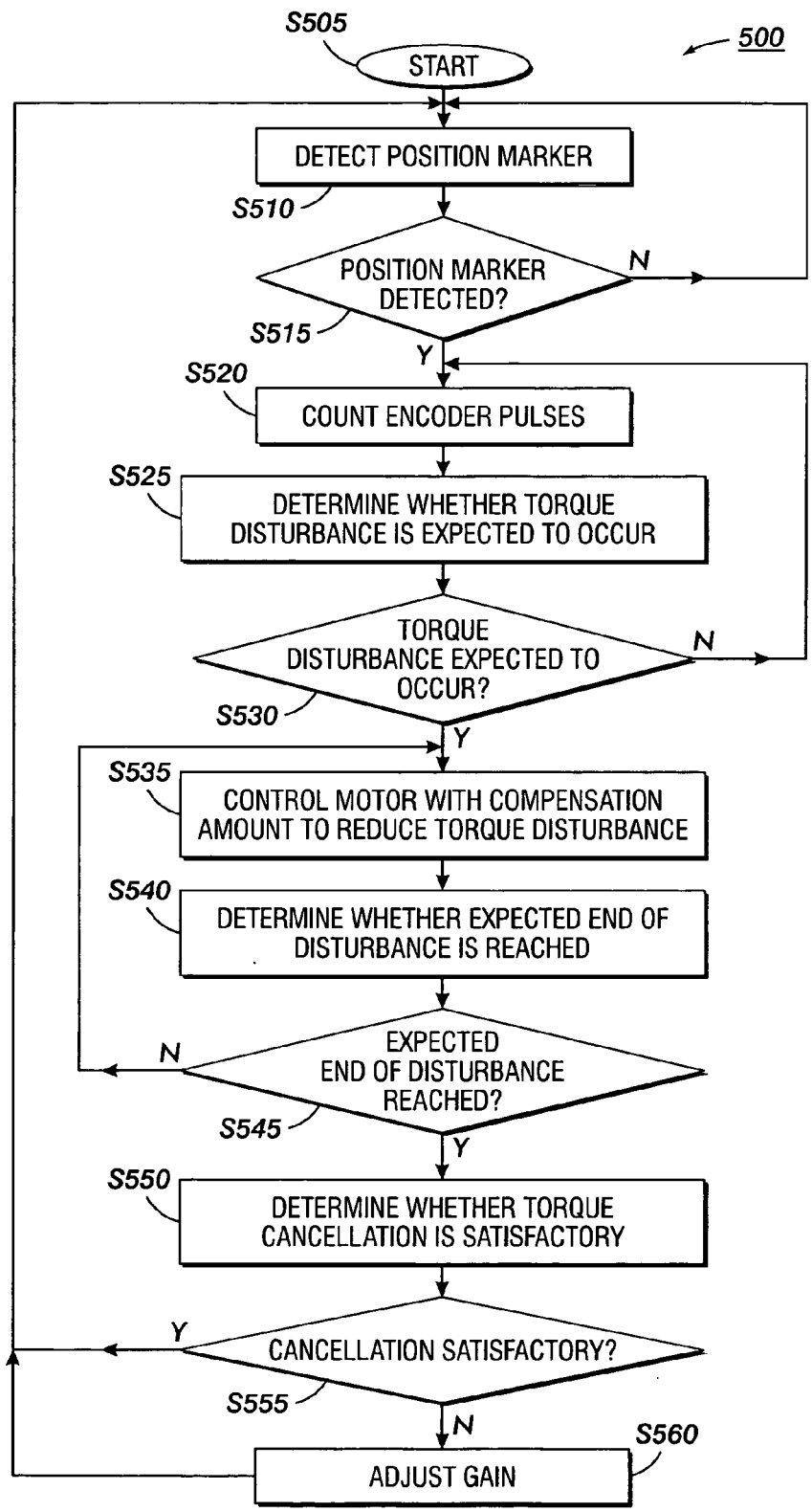
FIG. 5 is a flowchart illustrating an exemplary method for reducing torque disturbance in accordance with various aspects of the invention.

An exemplary operation 500 of the exemplary aspects described above with respect to FIGS. 1–4 is described with respect to FIGS. 5. Referring to FIG. 5, the exemplary operation 500 commences at stage S505, for example, when the printing machine is printing images to a substrate. Control continues to stage S510, where a sensor (not shown) coupled with the controller 74 attempts to detect a position marker 414 of the belt 12. For example, the belt 12 may include a hole, a cutout, a notch, or any other sensable feature. Control then continues to stage S515.

In stage S515, the controller 74 determines whether the position marker 414 is detected. If the position marker 414 is not detected, control returns to stage S510, where the sensor continues to attempt to detect the position marker 414. If the position marker 414 is detected, control continues to stage S520, where the controller 74 begins counting encoder pulses. Control continues to stage S525.

Then, in stage S525, the controller 74 determines whether the torque disturbance is expected to occur at the present time. The controller 74 can make this determination because the number of encoder pulses between the time the position marker is detected and the expected time of the torque disturbance are substantially known. Control continues to stage S530.

Next, in stage S530, if it is determined that the torque disturbance is not expected to occur at the present time, control returns to stage S520, where the controller 74 continues to count encoder pulses and determine whether the torque disturbance is expected to occur (S525). If, in stage S530, it is determined that the torque disturbance is expected to occur, control continues to stage S535.

In stage S535, the controller 74 controls the motor 20 with a compensation amount for reducing the torque disturbance. The compensation amount may be retrieved from a lookup table or determined by a mathematical algorithm. Control continues to stage S540.

Then, in stage S540, the controller 74 determines whether the expected end of the torque disturbance is reached, and control continues to stage S545. In stage S545, if it is determined that the expected end of the torque disturbance has not been reached, control returns to stage S535, where the controller 74 controls the motor 20 with a compensation amount for reducing the torque disturbance.

If, in stage S545, it is determined that the expected end of the torque disturbance has been reached, control continues to stage S550. In stage S550, the controller 74 may determine whether the reduction of the torque disturbance is satisfactory. The controller 74 may make this determination by timing the period between the encoder pulse where the torque disturbance is expected to begin and the encoder pulse where the torque disturbance is expected to end, that is, the period during which stage S535 is executed. Control then continues to stage S555.

If, in stage S555, it is determined that the reduction of the torque disturbance is satisfactory, control continues to stage S510, where the controller 74 awaits another detection of the belt position marker 414. If, in stage S555 it is determined that the reduction of the torque disturbance is not satisfactory (either too much or too little), control continues to stage S560. In stage S560, the controller 74 may adjust the gain factor 378 for further operations 500. Control then continues to stage S510, where the process is repeated beginning with stage S510.

The novel features of the present invention will become apparent to those of skill in the art upon examination of the disclosure or can be learned by practice of the present invention. It should be understood, however, that the detailed description of the invention and the specific examples presented, while indicating certain embodiments of the present invention, are provided for illustration purposes only, because various changes and modifications will become apparent to those of skill in the art from this disclosure.

What is claimed is:

1. A system for reducing torque disturbance, the system comprising:
    a motor mechanically coupled to an endless belt, the motor being operable to drive the belt, and the belt having a seam that causes a torque disturbance to the system;
    a data structure having a set of values that indicates an amount of compensation for reducing the torque disturbance; and
    a controller electrically coupled with the motor, the controller being configured to control the motor and reduce the torque disturbance based on the set of values in the data structure,
    wherein the belt includes a position marker at a distance from the seam, the controller being configured to determine when the torque disturbance is expected to occur based on sensing of the position marker and said distance.

2. The system of claim 1, wherein the data structure comprises at least one of a lookup table and a mathematical algorithm.

3. The system of claim 1, wherein the controller is a feedback controller.

4. The system of claim 3, wherein the controller is a proportional-integral-differential controller.

5. The system of claim 1, wherein the controller is configured to adjust the values being used to control the motor by a gain factor.

6. The system of claim 1, wherein the belt comprises a photoreceptor belt.

7. A method for reducing torque disturbance, the method comprising:
    controllably operating a motor to drive an endless belt in a cyclical manner;
    determining when a seam of the belt is expected to cause a torque disturbance to a system;
    determining an amount of compensation for reducing the torque disturbance; and
    controllably operating the motor based on the amount of compensation to reduce the torque disturbance.

8. The method of claim 6, wherein said determining an amount of compensation comprises at least one of retrieving values from a lookup table and determining values from a mathematical algorithm.

9. The method of claim 7, wherein said controllably operating includes controlling the motor via a feedback loop.

10. The method of claim 7, further comprising adjusting the values being used to control the motor by a gain factor.

11. The method of claim 7, wherein controllably operating a motor to drive an endless belt comprises controllably operating the motor to drive an endless photoreceptor belt.

12. A method for reducing torque disturbance, the method comprising:
    controllably operating a motor to drive an endless belt having a seam in a cyclical manner;
    sensing a position marker associated with the belt;
    determining when a torque disturbance is expected to occur based on said sensing of the position marker and a distance between the position marker and the seam;
    determining an amount of compensation for reducing the torque disturbance; and
    controllably operating the motor based on the amount of compensation to reduce the torque disturbance.

13. A recording medium having computer executable program code for a method of reducing torque disturbance, the method comprising:
    controllably operating a motor to drive an endless belt in a cyclical manner;
    determining when a seam of the belt is expected to cause a torque disturbance to a system;
    determining an amount of compensation for reducing the torque disturbance; and
    controllably operating the motor based on the amount of compensation to reduce the torque disturbance.

14. A printing system, comprising:
    a belt having two ends joined together to form a seam;
    a motor mechanically coupled to the belt, the motor being operable to drive the belt;
    an acoustic transfer assist device configured to transfer an image from the belt to a medium, the assist device including a vacuum source for drawing the belt toward the assist device, the vacuum source and the seam cooperating to cause a torque disturbance to the system;
    a data structure having a set of values that indicates an amount of compensation for reducing the torque disturbance; and
    a controller electrically coupled with the motor, the controller being configured to control the motor and reduce the torque disturbance based on the set of values in the data structure,
    wherein the belt includes a position marker at a distance from the seam, the controller being configured to determine when the torque disturbance is expected to occur based on sensing of the position marker and said distance.

15. The system of claim 14, wherein the data structure comprises at least one of a lookup table and a mathematical algorithm.

16. The system of claim 14, wherein the controller is a feedback controller.

17. The system of claim 16, wherein the controller is a proportional-integral-differential controller.

18. The system of claim 14, wherein the controller is configured to adjust the values being used to control the motor by a gain factor.

19. The printing system of claim 14, wherein the belt comprises a photoreceptor belt.

* * * * *